(12) United States Patent
Wakumoto et al.

(10) Patent No.: US 7,447,222 B2
(45) Date of Patent: Nov. 4, 2008

(54) AUTOMATED PATH TRACING THROUGH SWITCHING MESH

(75) Inventors: Shaun Kazuo Wakumoto, Roseville, CA (US); Cetin Ersoy, Portsmouth, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 875 days.

(21) Appl. No.: 10/706,653

(22) Filed: Nov. 12, 2003

(65) Prior Publication Data

US 2005/0099948 A1    May 12, 2005

(51) Int. Cl.
*H04L 12/56* (2006.01)
(52) U.S. Cl. .......... 370/406; 370/407; 370/408; 370/235
(58) Field of Classification Search .......... 370/241, 370/239, 229, 241.1, 216, 379, 503, 340, 370/375, 235–238.1, 351, 389–390, 400–410
See application file for complete search history.

(56) References Cited

U.S. PATENT DOCUMENTS

| | | | |
|---|---|---|---|
| 5,859,848 A * | 1/1999 | Miura et al. ........... 370/395.31 |
| 6,556,541 B1 * | 4/2003 | Bare ..................... 370/235 |
| 6,580,715 B1 | 6/2003 | Bare | |
| 6,711,171 B1 * | 3/2004 | Dobbins et al. .......... 370/400 |
| 6,778,524 B1 * | 8/2004 | Augart ................. 370/351 |
| 6,947,384 B2 * | 9/2005 | Bare ..................... 370/235 |
| 7,031,341 B2 * | 4/2006 | Yu ....................... 370/469 |
| 7,327,688 B2 * | 2/2008 | Burwell et al. .......... 370/242 |
| 2001/0056490 A1 * | 12/2001 | Nagami et al. .......... 709/227 |
| 2002/0172158 A1 * | 11/2002 | Hoefelmeyer et al. ..... 370/241 |
| 2003/0198186 A1 * | 10/2003 | Hoefelmeyer et al. ..... 370/241 |
| 2005/0013297 A1 * | 1/2005 | Eriksson ................. 370/392 |

* cited by examiner

*Primary Examiner*—Chi H. Pham
*Assistant Examiner*—Thai D. Hoang (57) ABSTRACT

One embodiment disclosed relates to a method of automated path tracing from an original mesh switch through a switching mesh to a specified destination. A mesh traceroute packet to the specified destination is built. The mesh traceroute packet is transmitted via an exit port associated with the specified destination and the returned packet is received. Another embodiment disclosed relates to a method of responding to receipt of a mesh traceroute packet during an automated path tracing. The mesh traceroute packet is received at a switch. A hop entry is appended to the mesh traceroute packet by the switch.

10 Claims, 10 Drawing Sheets

```
+--------+------+-----+-------+--------+--------+--------+------+-----+-------+
| mesh   | pkt  | ver | flags | marked | search | search | hop  | pad | hop   |
| header | type | seq |       | bits   | mac    | vid    | cnt  |     |entries|
|        |      |     |       |        |        |        |      |     |       |
|  602   | 604  | 606 |  610  |  612   |  614   |  616   | 618  | 619 |  620  |
|        |      | 608 |       |        |        |        |      |     |       |
+--------+------+-----+-------+--------+--------+--------+------+-----+-------+
|------ 32 -----|  4     4       4        6        2        1     3      40
                                                                         bytes +-----+-----+--------+--------+---------+--------+--------+----------+-------+
| hop | hop | hop in | hop in | in cost | hop out| hop out| out cost | port  |
|flags| mac | port   | portStr|         | port   | portStr|          | speed |
|     |     |        |        |         |        |        |          |       |
| 622 | 624 |  626   |  628   |   630   |  632   |  634   |   636    |  638  |
|     |     |        |        |         |        |        |          |       |
+-----+-----+--------+--------+---------+--------+--------+----------+-------+
   4     6      2        8         4        2        8         4         2
                                                                      bytes
```

| hop flags | hop mac | hop in port | hop in portStr | in cost | hop out port | hop out portStr | out cost | port speed |
|---|---|---|---|---|---|---|---|---|
| 622 | 624 | 626 | 628 | 630 | 632 | 634 | 636 | 638 |
| 4 | 6 | 2 | 8 | 4 | 2 | 8 | 4 | 2 bytes |

FIG. 6B

```
switch$ meshTraceroute xxxxxx-xxxxxx v
Traceroute to MAC Address: xxxxxx-xxxxxx VID: v
hop  Switch Address    inPort  outPort  inCost  outCost  Speed
 0   aaaaaa-aaaaaa              o1               0       d1     s1
 1   bbbbbb-bbbbbb      p2      o2       c2               d2     s2
 2   cccccc-cccccc      p3      o3       c3               0      s3
Trace route is completed. Total hops to destination is 3
switch$
```

FIG. 7

AUTOMATED PATH TRACING THROUGH SWITCHING MESH

BACKGROUND OF THE INVENTION

1. Field of the Invention

The present invention relates generally to communication networks. More specifically, the present invention relates to network switches and diagnostics.

2. Description of the Background Art

It is common in conventional computing environments to connect a plurality of computing systems and devices through a communication medium often referred to as a network. Such networks among communicating devices permit devices (or users of devices) to easily exchange and share information among the various devices. The Internet is a presently popular example of such networking on a global scale. Individual users attach their computers to the Internet, thereby enabling sharing of vast quantities of data on other computers geographically dispersed throughout the world.

Networked computing systems may be configured and graphically depicted in a wide variety of common topologies. In other words, the particular configurations of network communication links (also referred to as paths) and devices between a particular pair of devices wishing to exchange information may be widely varied. Any particular connection between two computers attached to a network may be direct or may pass through a large number of intermediate devices in the network. In addition, there may be a plurality of alternative paths through the network connecting any two network devices. Computing networks are therefore complex and vary in their configurations and topologies.

Certain network communication media and protocols are referred to as packet oriented. A protocol or communication medium may be said to be packet oriented in that information to be exchanged over the network is broken into discrete sized packets of information. A block of information to be transferred over the network is decomposed into one or more packets for purposes of transmission over the network. At the receiving end of the network transmission, the packets are re-assembled into the original block of data.

In general, each packet includes embedded control and addressing information that identifies the source device which originated the transmission of the packet and which identifies the destination device to which the packet is transmitted. Identification of source and destination devices is by means of an address associated with each device. An address is an identifier which is unique within the particular computing network to identify each device associated with the network. Such addresses may be unique to only a particular network environment (i.e., a network used to interconnect a single, self-contained computing environment) or may be generated and assigned to devices so as to be globally unique in co-operation with networking standards organizations.

At the lowest level of network communication, such addresses are often referred to as MAC address (Media ACcess address). Network protocols operable above this lowest level of communication may use other addresses for other purposes in the higher-level communication techniques.

In many conventional commercially-available network environments, the network communication medium is in essence a bus commonly attached to a plurality of devices over which the devices exchange. In a simple networking topology, all devices may be attached to such a bus-structured common network medium. Any particular single network medium has a maximum data exchange bandwidth associated therewith. The maximum data exchange bandwidth of a medium is determined by a number of electrical and physical properties of the medium and protocols used to communicate over that medium. For example, a popular family of related network media and protocols are collectively referred to as Ethernet. Ethernet defines a standard protocol for the exchange of messages over the communication medium. A variety of communication media are also defined as part of the Ethernet family. The communication bandwidth of the Ethernet family of standards may change over time, but conventionally ranges from approximately 10 Mbit (million bits of information) per second to 1 Gbit per second. Therefore, a single (slow) Ethernet connection, for example, has a maximum data exchange bandwidth of approximately 10 Mbit per second.

In conventional network computing environments, a number of devices are used in addition to interconnected computing systems to efficiently transfer data over the network. Routers and switches are in general network devices which segregate information flows over various segments of a computer network. A segment, as used herein, is any subset of the network computing environment including devices and their respective interconnecting communication links. As noted above, a single computer network communication link has a maximum data transfer bandwidth parameter defining the maximum rate of information exchange over that network. Where all devices on a computer network share a common network medium, the maximum bandwidth of the computer network may be rapidly reached. The overall performance of the networked computing environment may be thereby reduced because information exchange requests may have to await completion of earlier information exchange requests presently utilizing the communication link.

It is often the case, however, that particular subsets of devices attached to the network have requirements for voluminous communication among members of the same subset but less of a requirement for information exchange with other devices outside their own subset. Though standard switch features generally do not include identifying such logical groupings of devices, some enhanced switching features do permit such logic to be performed within a switch device. For example, some enhanced switch features include the concept of defining and routing information based on virtual LAN (VLAN) definitions. In a VLAN, a group of devices may be defined as logically being isolated on a separate network although physically they are connected to a larger network of devices. VLAN features of enhanced switches are capable of recognizing such VLAN information and can route information appropriately so that devices in a particular VLAN are logically segregated from devices outside the VLAN. A VLAN is identified using a VLAN identifier (VID).

For example, the financial department of a large corporation may have significant information exchange requirements within the financial department but comparatively insignificant needs for data exchange with other departments. Likewise, an engineering group may have significant needs for data exchange within members (computing systems and devices) of the same engineering group but not outside the engineering group. There may in fact be multiple of such subsets of devices in a typical computing network. It is therefore desirable to segregate such subsets of devices from one another so as to reduce the volume of information exchange applied to the various segments of the computer network.

In particular, a switch device is a device that filters out packets on the network destined for devices outside a defined subset (segment) and forwards information directed between computing devices on different segments of a networked computing environment. The filtering and forwarding of such information is based on configuration information within the switch that describes the data packets to be filtered and forwarded in terms of source and/or destination address information (once address locations are "learned" by the switch (es)).

Network switch devices and protocols associated therewith are also used to manage redundant paths between network devices. Where there is but a single path connecting two network devices, that single path, including all intermediate devices between the source and destination devices, represent a single point of failure in network communications between that source and destination device. It is therefore common in network computing environments to utilize a plurality of redundant paths to enhance reliability of the network. Multiple paths between two devices enhances reliability of network communication between the devices by allowing for a redundant (backup) network path to be used between two devices when a primary path fails.

SUMMARY

One embodiment of the invention pertains to a method of automated path tracing from an original mesh switch through a switching mesh to a specified destination. A mesh traceroute packet to the specified destination is built. The mesh traceroute packet is transmitted via an exit port associated with the specified destination and the returned packet is received.

Another embodiment of the invention relates to a switching device configured to be a member of a switching mesh. The switching device includes at least a plurality of ports and a switch control device coupled to the plurality of ports. The switch control device is configured to perform an automated method of tracing a path through the switching mesh to a specified destination.

Another embodiment of the invention relates to a method of responding to receipt of a mesh traceroute packet during an automated path tracing. The mesh traceroute packet is received at a switch. A hop entry is appended to the mesh traceroute packet by the switch.

DETAILED DESCRIPTION

An embodiment of the present invention overcomes or reduces certain disadvantages of prior mesh-related protocols. As discussed below, determining the path that a packet would take to a given destination within a mesh can be a difficult task. Unlike a normal set of switches, a mesh could have different paths for the addresses learnt from the same switch. To aid in field and in-house debugging, a mesh traceroute protocol is hereby presented that allows a user to quickly determine the path that a packet would take given a destination MAC address and VID.

Figure 1:
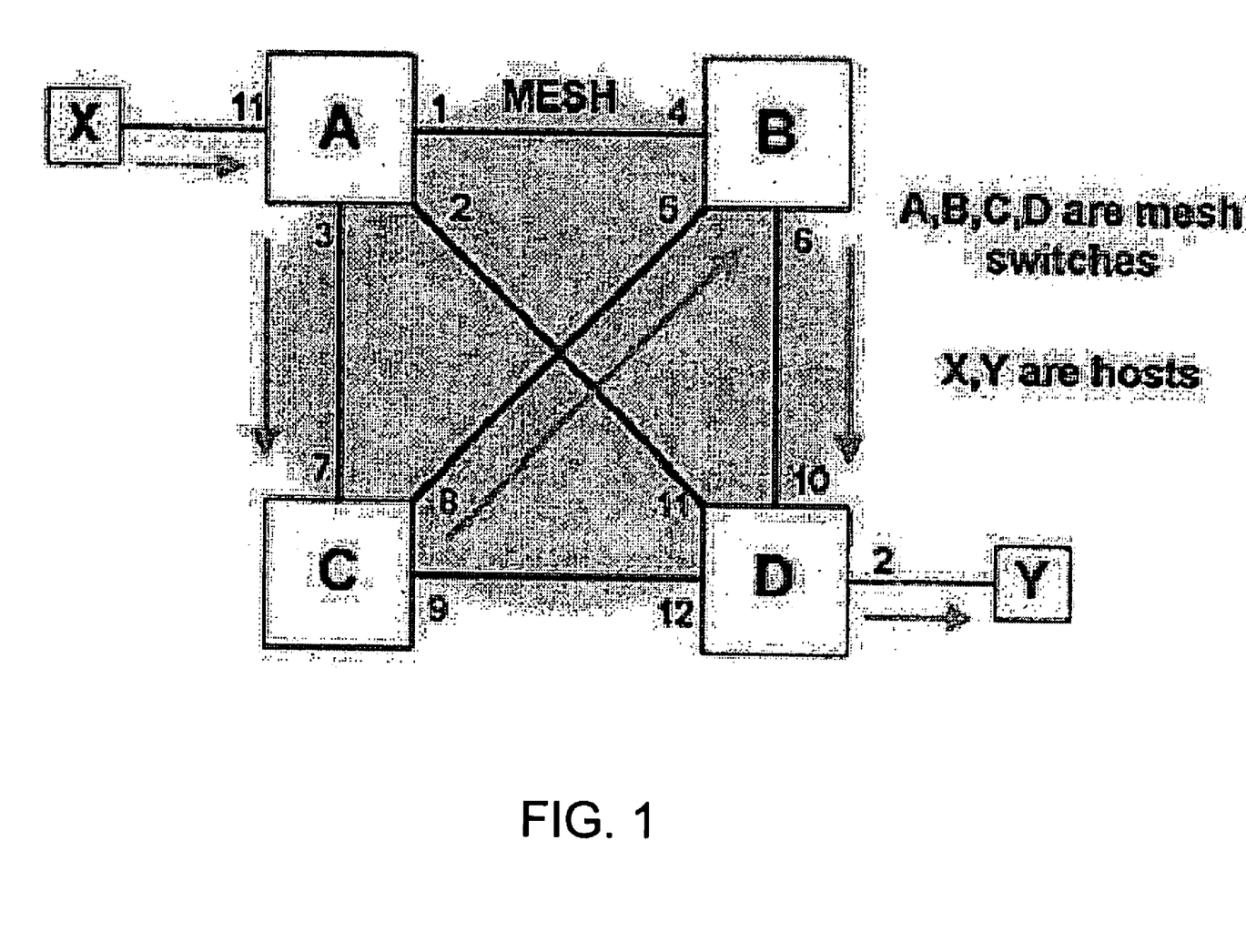
FIG. 1 is a schematic diagram depicting a switching mesh.

FIG. 1 is a schematic diagram depicting a switching mesh. In the example of FIG. 1, the overall switching mesh comprises four interconnected mesh switches (A, B, C, and D). Port 1 of switch A connects to port 4 of switch B. Port 2 of switch A connects to port 11 of switch D. Port 3 of switch A is connected to port 7 of switch C. Port 5 of switch B is connected to port 8 of switch C. And so on.

In addition, host computers are depicted as coupled to the mesh. Host computer X is coupled to the mesh by way of port 11 of switch A. Host computer Y is coupled to the mesh by way of port 12 of switch D. Of course, these two host computers are shown for purposes of discussion, and many more host computers may communicate with each other by way of the switching mesh.

As shown in the example of FIG: 1, host X is sending traffic to host Y. The path transversed by the traffic is as follows: enters port 11 of switch A; exits port 3 of switch A; enters port 7 of switch C; exits port 8 of switch C; enters port 5 of switch B; exits port 6 of switch B; enters port 10 of switch D; and exits port 12 of switch D.

Figure 2:
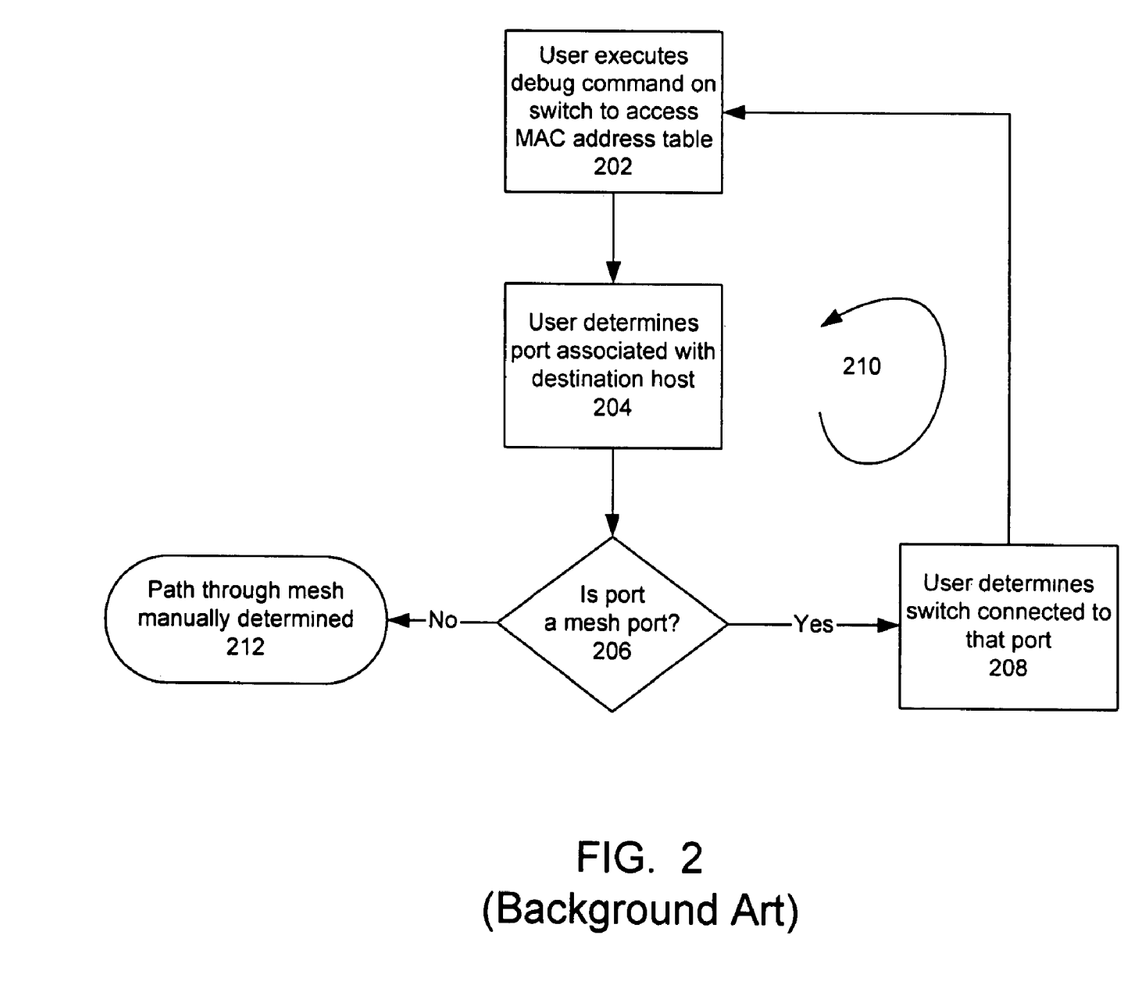
FIG. 2 is a flow chart depicting a conventional method of tracing a path in a switching mesh.

FIG. 2 is a flow chart depicting a conventional method of tracing a path in a switching mesh. As described further below, the conventional method involves going to each switch along the path and running a debug command.

After determining by which switch the packet first enters the mesh, a user executes 202 a debug command on that switch. The debug command is used to determine 204 the exit port associated with the destination MAC address and VID. In other words, using the MAC/VID pair of the packet, the user is able to determine the exit port.

With the exit port found, a determination 206 is made as to whether the exit port comprises a mesh port. In other words, does the port lead to another mesh switch, or does the port lead outside the switching mesh? If the port is a mesh port, then the user determines 208 the mesh switch connected to that port and the method loops 210 back to where the user executes 202 the debug command on that next switch. The method continues in this loop 210 until it is determined that the exit port is not a mesh port. If the port is not a mesh port, then the path through the switching mesh is complete and so has been manually determined 212.

As a more concrete illustration, consider the conventional method of FIG. 2 in the context of the configuration in FIG. 1. In particular, consider a packet from host X that is destined for host Y along the path shown in FIG. 1. The steps needed in order to trace the packet through the mesh are now described. These steps show the tedious and error prone nature of the conventional method.

After determining that the packet enters port 11 of switch A, the user executes 202 the debug command on switch A so as to determine 204 that packets destined for host Y exit through port 3. Port 3 is a mesh port, so the user determines 208 that port 3 connects to port 7 of switch C.

Next, the user executes 202 the debug command on switch C so as to determine 204 that packets destined for host Y exit through port 8. Port 8 is a mesh port, so the user determines 208 that port 8 connects to port 5 of switch B.

Next, the user executes 202 the debug command on switch B so as to determine 204 that packets destined for host Y exit through port 6. Port 6 is a mesh port, so the user determines 208 that port 6 connects to port 10 of switch D.

Finally, the user executes 202 the debug command on switch D so as to determine 204 that packets destined for host Y exit through port 2. Port 2 is not a mesh port, so the path through the mesh is complete.

Hence, the path has been manually determined 212 to be as follows: enter port 11 of switch A; exit port 3 of switch A; enter port 7 of switch C; exit port 8 of switch C; enter port 5 of switch B; exit port 6 of switch B; enter port 10 of switch D; and exit port 12 of switch D.

As seen from the above concrete illustration, the conventional process is disadvantageously performed manually and is lengthy and open to errors. An embodiment of the present invention overcomes disadvantages of the above-described conventional process.

The discussion of the invention herein includes the terms original mesh switch, destination mesh switch, and hop mesh switch. An original (or originating) mesh switch is the mesh switch that requests the traceroute. In FIG. 1, switch A is the original mesh switch for the path depicted. The destination mesh switch "owns" the MAC/VID pair that is being traced. In FIG. 1, mesh switch D is the destination mesh switch. Hop mesh switches are mesh switches on the path of the trace. Per the path depicted in FIG. 1, mesh switches C and B are hop mesh switches. In other words, a hop mesh switch is a mesh switch on the path of the trace, but is neither the original mesh switch nor the destination mesh switch.

Figure 6A:
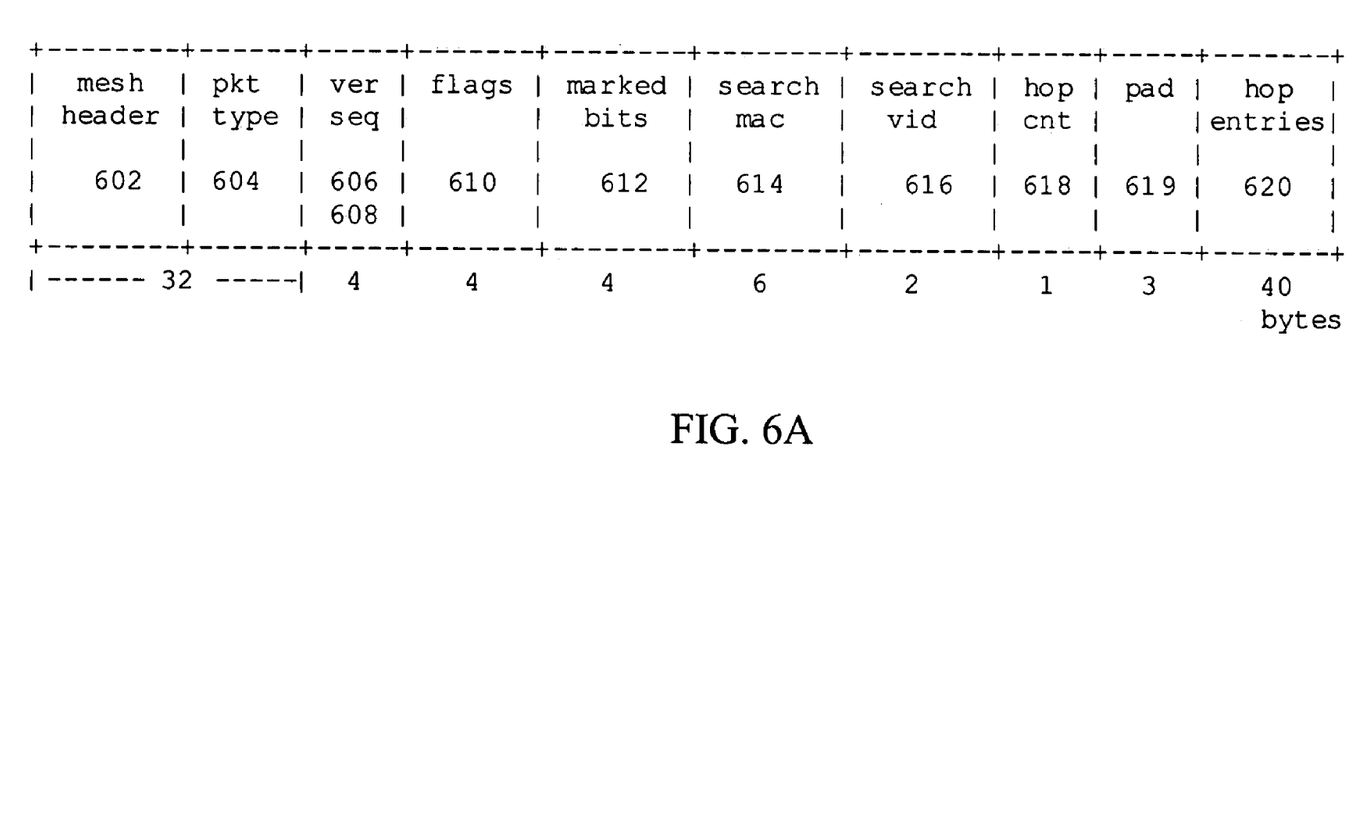
FIG. 6A is a schematic diagram depicting a structure of a mesh traceroute packet in accordance with an embodiment of the invention.

FIG. 6A is a schematic diagram depicting a structure of a mesh traceroute packet in accordance with an embodiment of the invention. Per the depicted embodiment, the mesh traceroute packet may include a mesh header 602, a packet type 604, a mesh traceroute version 606, a sequence number 608, flags 610, marked bits 612, a search MAC address 614, a search VID 616, a hop count 618, padding 619, and hop entries 620.

In accordance with this specific embodiment, the mesh header 602 includes meshing-related information that may be utilized by the mesh switches. The packet type 604 may comprise, for example, either a request type (0x0D) or an acknowledgement type (0x8D). For each packet generated, the sequence number 608 is incremented and eventually wraps around (for example, at 65,535 if 2 bytes are used for the sequence number).

In accordance with one embodiment, the flags 610 for the mesh traceroute comprises operational mode flags and operational status flags. The operational mode flags may include TRACE_DISCOVER, TRACE_HOP, and TRACE_COMPLETE. The TRACE_DISCOVER flag indicates that the packet is being used to learn the path of the search MAC/VID. The TRACE_HOP flag indicates that the packet comprises a response from a hop switch. The TRACE_COMPLETE flag indicates that the trace is done and indicates that the status bits should be checked for the result. The operational status flags may include TRACE_FOUND, TRACE_UNKNOWN_ADDR_FAIL, TRACE_RTX_FAIL, and TRACE_LOOP_DETECT. The TRACE_FOUND flag indicates that the trace was successful. The TRACE_UNKNOWN_ADDR_FAIL indicates that the switch does not know (cannot find) the search MAC/VID. The TRACE_RTX_FAIL flag indicates a retransmission failure due to lack of response from the next switch. The TRACE_LOOP_DETECT flag indicates a loop has been detected in the MAC/VID path.

The marked bits 612 includes a loop bit per switch in the mesh. Each loop bit comprises a flag indicating whether a corresponding mesh switch has already "seen" this packet. In one embodiment, the loop bit for a mesh switch is marked when the mesh switch forwards a mesh traceroute packet, and the loop bit for a mesh switch is cleared when the mesh switch returns the completed traceroute packet to the original mesh switch. The search MAC address 614 comprises the MAC address that is being traced. The search VID 616 comprises the VID of the MAC address that is being traced. The hop count 618 comprises the number of mesh switches that have are hopped. The format for each of the hop entries 620 is described further below in relation to FIG. 6B.

Figure 6B:
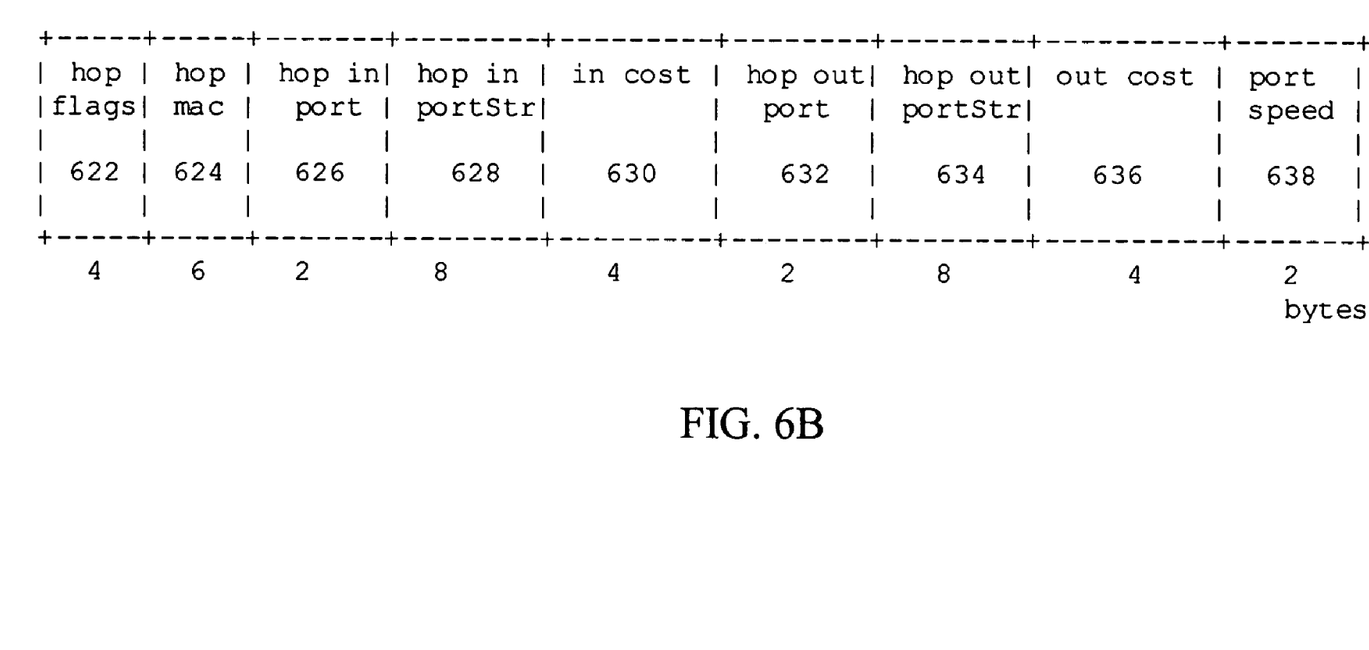
FIG. 6B is a schematic diagram depicting a structure of each of the hop entries in accordance with an embodiment of the invention.

FIG. 6B is a schematic diagram depicting a structure of each of the hop entries 620 in accordance with an embodiment of the invention. Per the depicted embodiment, a hop entry may include hop flags 622, hop MAC 624, hop in-port 626, hop in-port string 628, in-cost information 630, hop out-port 632, hop out-port string 634, out-cost information 636, and port speed 638.

In accordance with this specific embodiment, the hop flags 622 may be reserved for future use. The hop MAC 624 comprises the MAC address of the mesh switch being hopped. The hop in-port 626 comprises the port that the mesh traceroute packet came in on. As described further below, the hop in-port may be used in relation to the return path for the traceroute packet. The hop in-port string 628 comprises a description of the inbound port in the form of a string (for example, an octet or 8 byte length string). The in-cost information 630 comprises the cost information associated with the inbound port. The hop out-port 632 comprises the port from which the mesh traceroute packet will exit. The hop out-port string 634 comprises a description of the outbound port in the form of a string (for example, an octet or 8 byte length string). The out-cost information 636 comprises the cost information associated with the outbound port. The port speed 638 comprises the speed of the outbound port.

In accordance with an embodiment of the invention, the hop entry is appended by each hop mesh switch along the way to the destination mesh switch. The hop count is also incremented with each hop. One specific implementation may limit a path through the mesh to not more than 5 hops. This limits the number of hop entries to 7 at most. In other implementations, the number of allowed hops may have different limits or may not be so limited.

Figure 3:
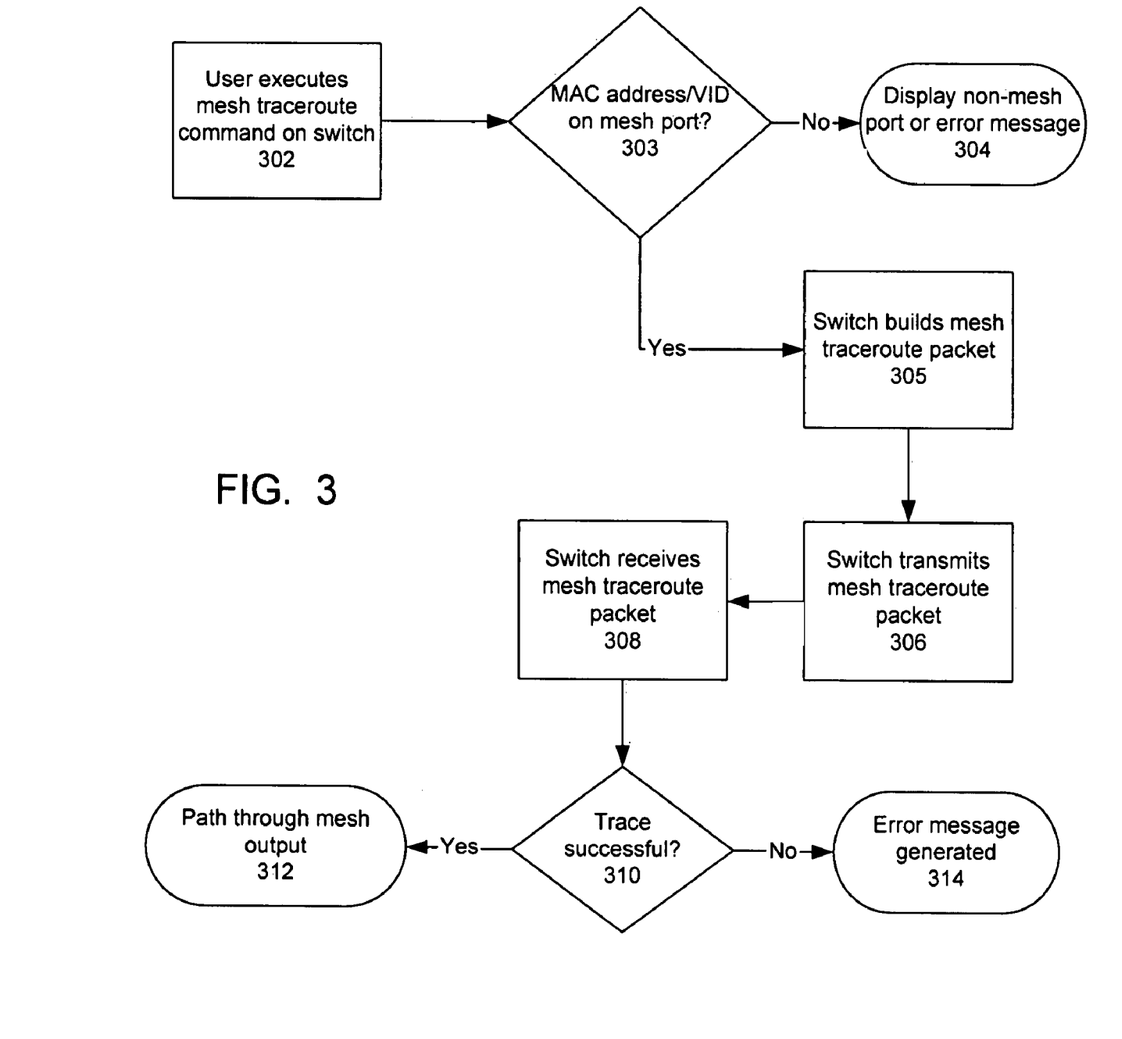
FIG. 3 is a flow chart depicting an automated method of tracing a path in a switching mesh in accordance with an embodiment of the invention.

FIG. 3 is a flow chart depicting an automated method of tracing a path in a switching mesh in accordance with an embodiment of the invention. As described further below, the automated method uses a new mesh traceroute protocol. The mesh traceroute protocol is a test protocol which allows users, such as support engineers and laboratory engineers, to determine the path a packet will take given a search MAC address and VID.

A user executes 302 a mesh traceroute command on the original mesh switch. The mesh traceroute command initiates the following actions by the original mesh switch.

The search MAC address and VID pair is first checked to determine 303 Whether or not it is associated with a mesh port. If the MAC/VID pair is not associated with a mesh port, then the system may display 304 either the non-mesh port number associated with the pair, or an error message if no port is associated with the pair.

If the MAC/VID pair is associated with a mesh port, then the original mesh switch builds 305 a mesh traceroute packet. One embodiment of the mesh traceroute packet is described above in relation to FIGS. 6A through 6B. The mesh traceroute packet includes, among other fields, search MAC address and VID fields.

In accordance with one embodiment, the original mesh switch will mark a TRACE_DISCOVER bit in the flags field of the mesh traceroute packet. This indicates the mode of the trace. The original mesh switch may also create a first hop entry and append the first hop entry to the mesh traceroute packet. The first hop entry may include cost information inserted therein. The cost information may comprise the converged outbound cost information for the port that the search MAC/VID pair is programmed on. The port number for the search MAC/VID may be retrieved from an entry in a load balanced address table. The speed of the port associated with the search MAC/VID may also be inserted. If the entry is not found in the table, an error message may be sent back to the user and the trace execution may be stopped.

The original mesh switch transmits 306 the mesh traceroute packet. The transmission may be performed by way of the port associated with the search MAC/VID to the subsequent mesh switch along the path being traced. In one embodiment, a retransmission queue is utilized such that if a transmitting switch does not receive an acknowledgment within a period (for example, four seconds), then it retransmits the packet up to a set number of times (for example, two times). If the retransmission fails, then the switch may inform the user by way of an appropriate error message.

In accordance with an embodiment of the invention, the subsequent mesh switches may process the mesh traceroute packet as described below in relation to FIGS. 4A through 4C. Eventually, the original mesh switch receives 308 back the mesh traceroute packet.

If the TRACE_HOP flag is set, the received packet comprises an update from a hop mesh switch. The information in this packet may then be output back to the user. Otherwise, the switch checks the flags in the packet to determine 310 the success or failure of the trace.

First, the TRACE_COMPLETE flag may be checked. If the TRACE_COMPLETE flag is set, then the status flags are looked at to determine the success or failure of the trace. A success may be indicated if the TRACE_FOUND flag is set. If success is indicated, then the detailed information regarding the path through to the destination mesh switch is output 312. For example, a printout may be generated of the path taken. A failure may be indicated if the TRACE_UNKNOWN_ADDR_FAIL flag, or the TRACE_RTX_FAIL flag, or the TRACE_LOOP_DETECT flag is set. If failure is indicated, then an error message may be generated 314 to inform the user of the failed trace based on the flag set.

If the TRACE_COMPLETE flag is not set, then an error message may also be generated 314. Receiving back the packet at the original switch without the TRACE_COMPLETE flag set indicates an undesirable loop in the path. Hence, the error message can identify this undesirable loop to the user. The presence of a loop typically indicates a bug within the meshing protocol.

Figure 4A:
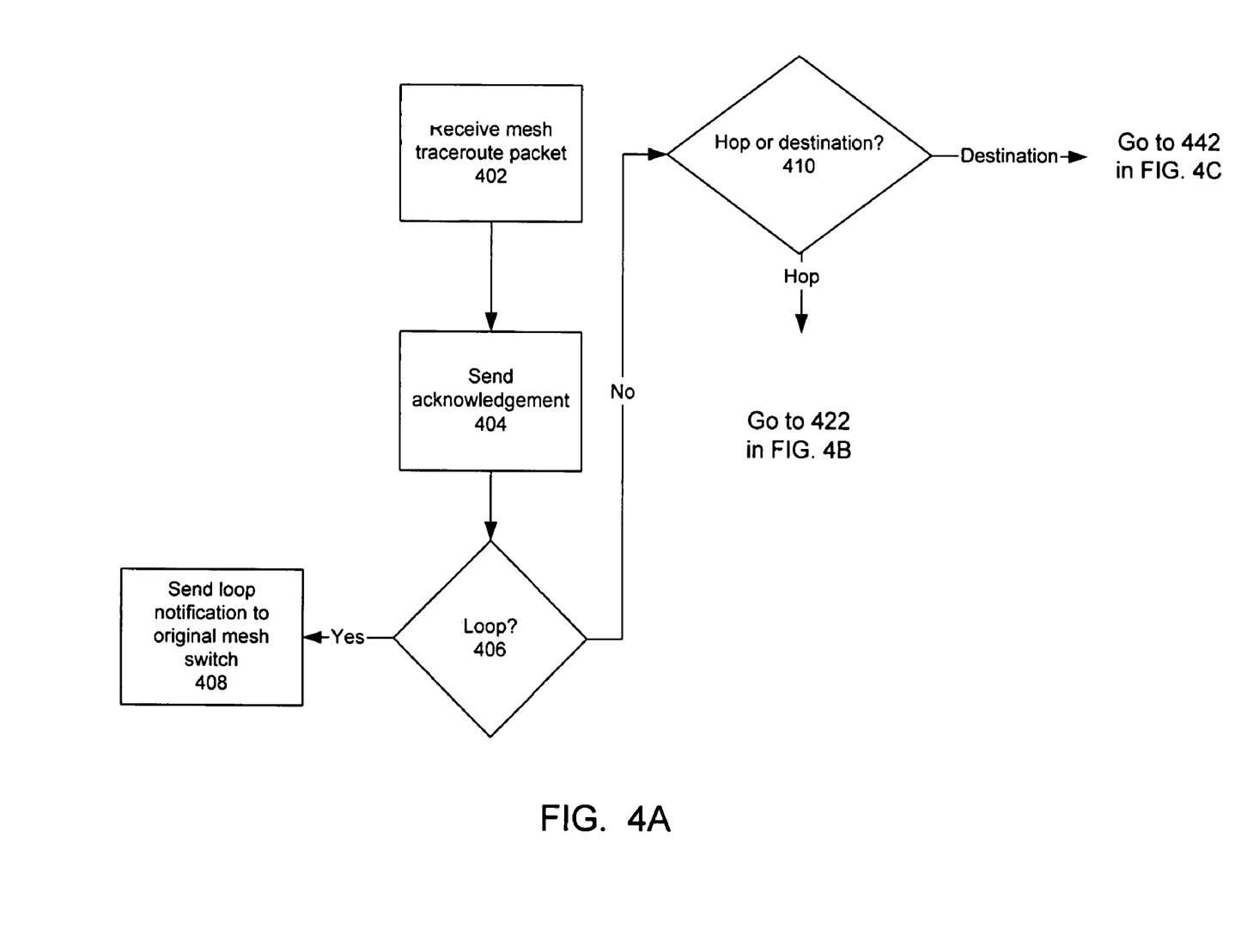
FIG. 4A is a flow chart depicting initial steps performed at non-originating mesh switches in response to receiving a mesh traceroute packet in accordance with an embodiment of the invention.

FIG. 4A is a flow chart depicting initial steps performed at non-originating mesh switches in response to receiving a mesh traceroute packet in accordance with an embodiment of the invention. Here, a non-originating mesh switch refers to either a hop mesh switch or a destination mesh switches (for example, the switches B, C and D in FIG. 1.

The process begins when the non-originating mesh switch receives 402 the mesh traceroute packet. Upon receiving the mesh traceroute packet, the mesh switch first sends 404 an acknowledgement packet to the sender to indicate that the traceroute packet was received. In one embodiment, the original packet, after the packet type changed to indicate the packet is an acknowledgement type, is used as the acknowledgement packet.

The non-originating mesh switch then determines 406 if the path of the mesh traceroute packet has formed a loop. In other words, a determination is made as to whether this switch has already seen this packet. In accordance with one embodiment, a loop has been formed if the receiving switch's loop bit is already set in the marked bits field.

If a loop has been formed, then a notification of the loop is sent 408 back to the original mesh switch. In one embodiment, this is done by clearing the TRACE_DISCOVER bit and setting the TRACE_LOOP_DETECT and TRACE_COMPLETE bits in the flags field. The packet is then sent back to the original mesh switch. In other words, if the packet is looped then the path is considered to be invalid, and the packet will be returned using the reverse path (using the hop entries). The original mesh switch may display the invalid path and print an error message. The formation of such a loop denotes a possible bug in the meshing code, and the invalid path should help an engineer determine the bug.

If no loop has been formed, then a determination 410 is made as to whether the non-originating mesh switch comprises a hop mesh switch or the destination mesh switch. If the switch is not the owner of the search MAC/VID (if the switch learnt this MAC/VID on a mesh port, or if the switch cannot find the MAC/VID), then it is a hop mesh switch and goes on to perform further steps described below in-relation to FIG. 4B. On the other hand, if the switch is the owner of the search MAC/VID (if the switch learnt this MAC/VID on a non-mesh port), then it is the destination mesh switch and goes on to perform further steps described below in relation to FIG. 4C.

Figure 4B:
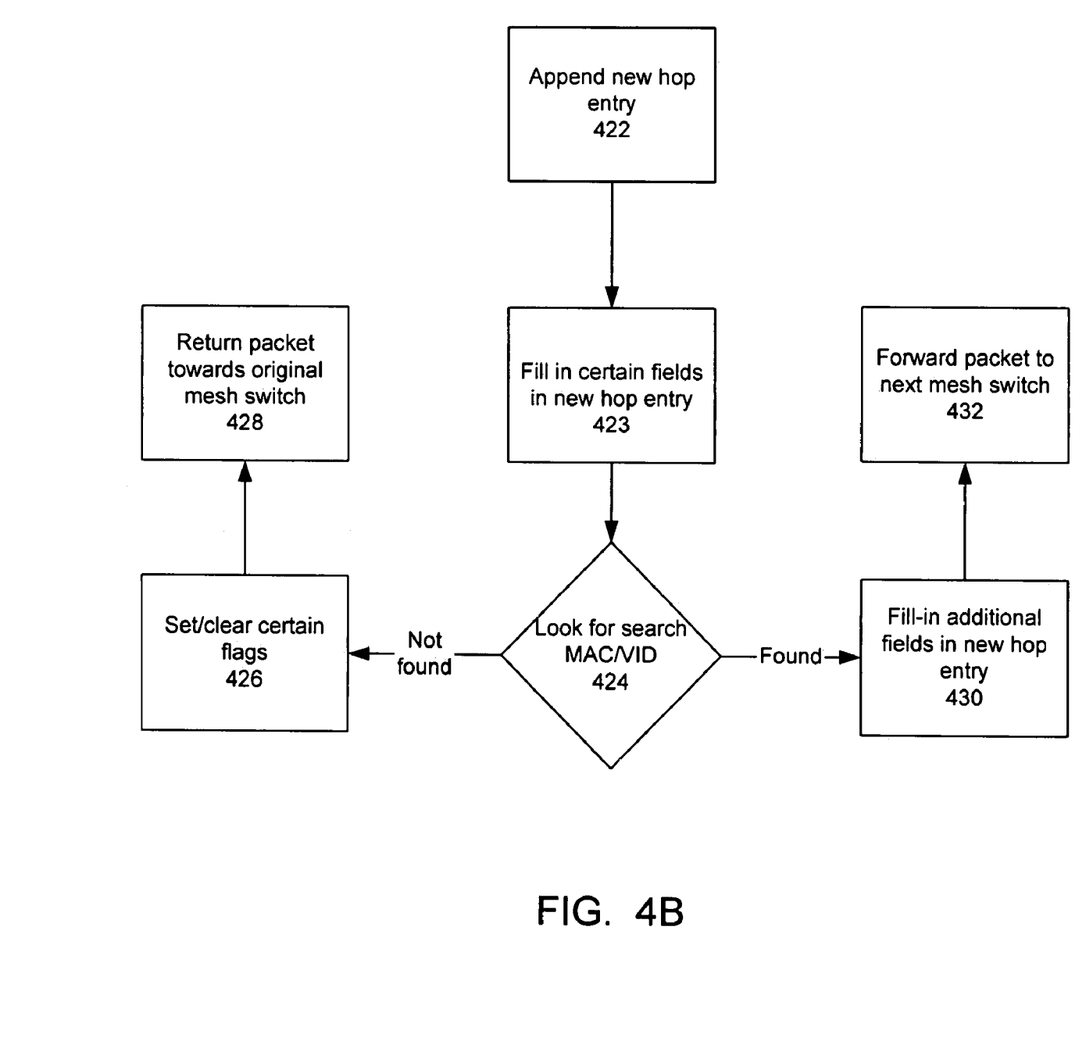
FIG. 4B is a flow chart depicting further steps performed at a hop mesh switch in accordance with an embodiment of the invention.

FIG. 4B is a flow chart depicting further steps performed at a hop mesh switch in accordance with an embodiment of the invention. Per FIG. 4B, the hop mesh switch appends 422 a new hop entry to the packet. Certain fields of the new hop entry are filled in 423 with information. In particular, the hop MAC field is filled with the MAC address of this hop mesh switch, and the hop in-port is filled with the port that the packet came in on (i.e. the inbound or entry port).

The hop mesh switch also looks 424 for the search MAC/VID in its MAC table. The MAC table includes entries which associate ports with MAC/VID pairs.

If the search MAC/VID is not found, the hop mesh switch clears/sets 426 certain flags the mesh traceroute packet and then returns 428 the packet towards the original mesh switch. In one embodiment, the clearing/setting 426 includes clearing the TRACE_DISCOVER bit and setting the TRACE_UNKNOWN_FAIL and the TRACE_COMPLETE bits in the flags field. The packet may be returned 428 back along a path that is the reverse of the trace path. The packet so returned comprises a failure response to the original mesh switch.

If the search MAC/VID is found, then the hop mesh switch fills 430 additional fields in the new hop entry with information. The hop out-port field of the new hop entry is filled with the port with which the MAC/VID is associated (i.e. the outbound or exit port). The hop mesh switch also fills in the in-cost information with the inbound cost information for the inbound port, and further fills in the out-cost information with the outbound cost information for the outbound port. The outbound port speed is also inserted into the new hop entry. The hop mesh switch then forwards 432 the packet out on the outbound port.

The forwarding 432 may be performed using a retransmission queue scheme that is similar to the one described above. However, if the retransmission iterations fail, then the TRACE_DISCOVER bit is cleared, the TRACE_RTX_FAIL and TRACE_COMPLETE bits in the flags filed are set, and the packet is returned to the original mesh switch via a path that is the reverse of the trace path. On the other hand, if the transmission succeeds and an acknowledgement from the next mesh switch is received by the hop mesh switch, then the hop mesh switch returns a modified copy of the packet to the original mesh switch. The modified copy is modified in that the TRACE_DISCOVER bit is cleared and the TRACE_HOP bit in the flags field is marked. Receipt of the modified copy by the original mesh switch indicates that this new hop has occurred and so provides an update as to the progress of the trace. This update may be output by the original mesh switch to the user.

Figure 4C:
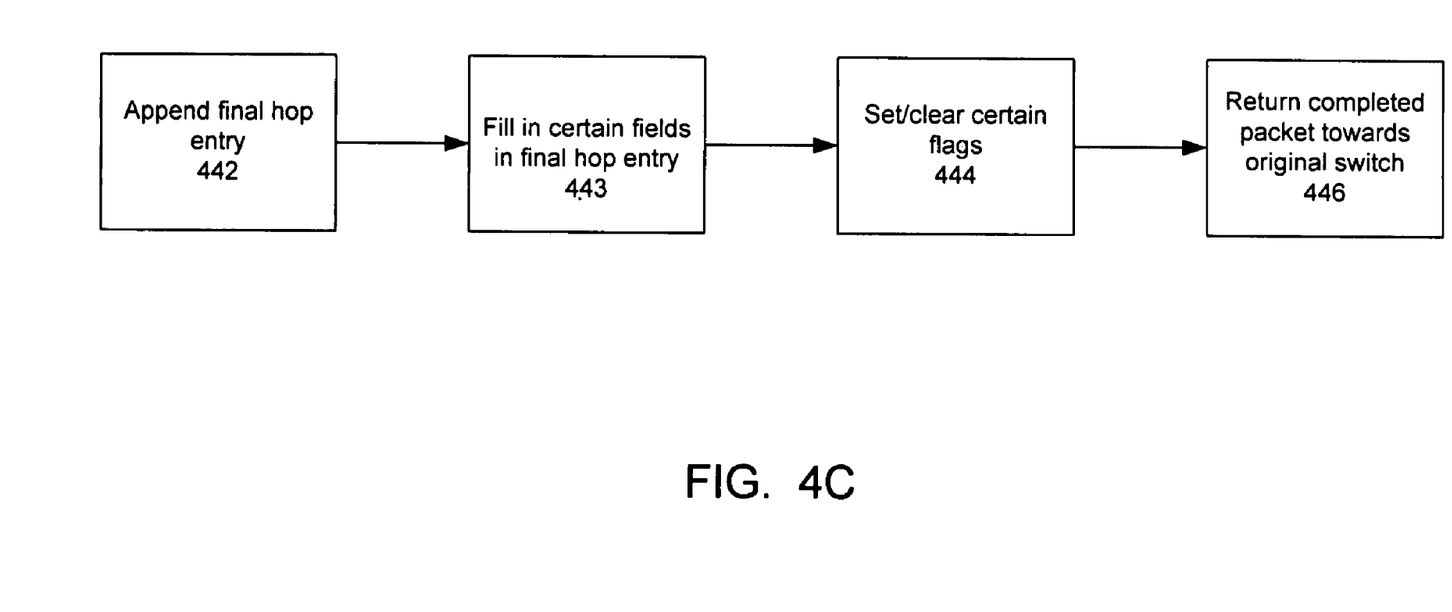
FIG. 4C is a flow chart depicting further steps performed at the destination mesh switch in accordance with an embodiment of the invention.

FIG. 4C is a flow chart depicting further steps performed at the destination mesh switch in accordance with an embodiment of the invention. Per FIG. 4C, the destination mesh switch appends 442 a new and final hop entry to the packet.

Certain fields of the final hop entry are filled in 443 with information. The hop MAC field is filled with the MAC address of the destination mesh switch, and the hop out-port is filled with the non-mesh port associated with the search MAC/VID. In addition, the inbound cost information is inserted for the port that the packet came in on. The outbound port speed is also inserted in the final hop entry, and the hop count is incremented. The outbound cost information field of the final hop entry is set to zero.

Certain flags (bits) are set/cleared 444. The TRACE_DISCOVER bit is cleared, and the TRACE_FOUND and TRACE_COMPLETE flags are set. The loop bit is not set in this situation.

The completed packet is then returned 446 to the original mesh switch. The completed trace packet is sent back out of the port that the packet was received on, and the return path comprises a path that is the reverse of the trace path.

Here we discuss in further detail the process of sending a packet back to the original mesh switch along the reverse trace path. When the trace is completed, hits a failure, or reaches a hop switch, it sends a packet back to the original mesh switch. The packet may be sent back in the reverse order that the packet has just taken. This comprises a reverse trace. When a hop mesh switch receives such a packet that is to be sent along the reverse trace path, it will send the packet to the previous hop switch in the path (or the original mesh switch if it is the last hop switch).

For example, consider the example depicted in FIG. 1. Consider that a user at switch A was trying to trace a MAC/VID that was learnt on switch D. Further, consider that the path that was assigned to that MAC/VID goes from mesh switch A to C to B to D. In this case, switch A is the original mesh switch, switch D is the destination mesh switch, and switches C and B are hop mesh switches. When switch D sends the completed trace back to switch A, it will send the completed trace packet back to switch B. Switch B will send it to switch C, and switch C will send it to switch A.

A hop mesh switch will know that the packet is to be sent along the reverse trace because it will examine the TRACE_COMPLETE and TRACE_HOP bits and see that either one of those bits are set. The hop mesh switch will then search for its entry within the hop entries and look at the hop in-port. It will use that port to send the packet back along the reverse trace. If its entry is not found or if the port is no longer a mesh port, then it will discard the packet.

In one embodiment, a hop mesh switch will first check to see if its loop bit is set in the marked bits field. Each mesh switch in the switching mesh has a unique loop bit in the marked bits field. If the mesh switch's loop bit is already cleared, then this indicates that either the switch is not a hop mesh switch or that the packet has been looped. If its loop bit is set, then the switch is confirmed to be a hop mesh switch. Prior to sending the packet to the next switch along the reverse trace, the switch will clear its loop bit in the marked bits field of the packet.

Figure 7:
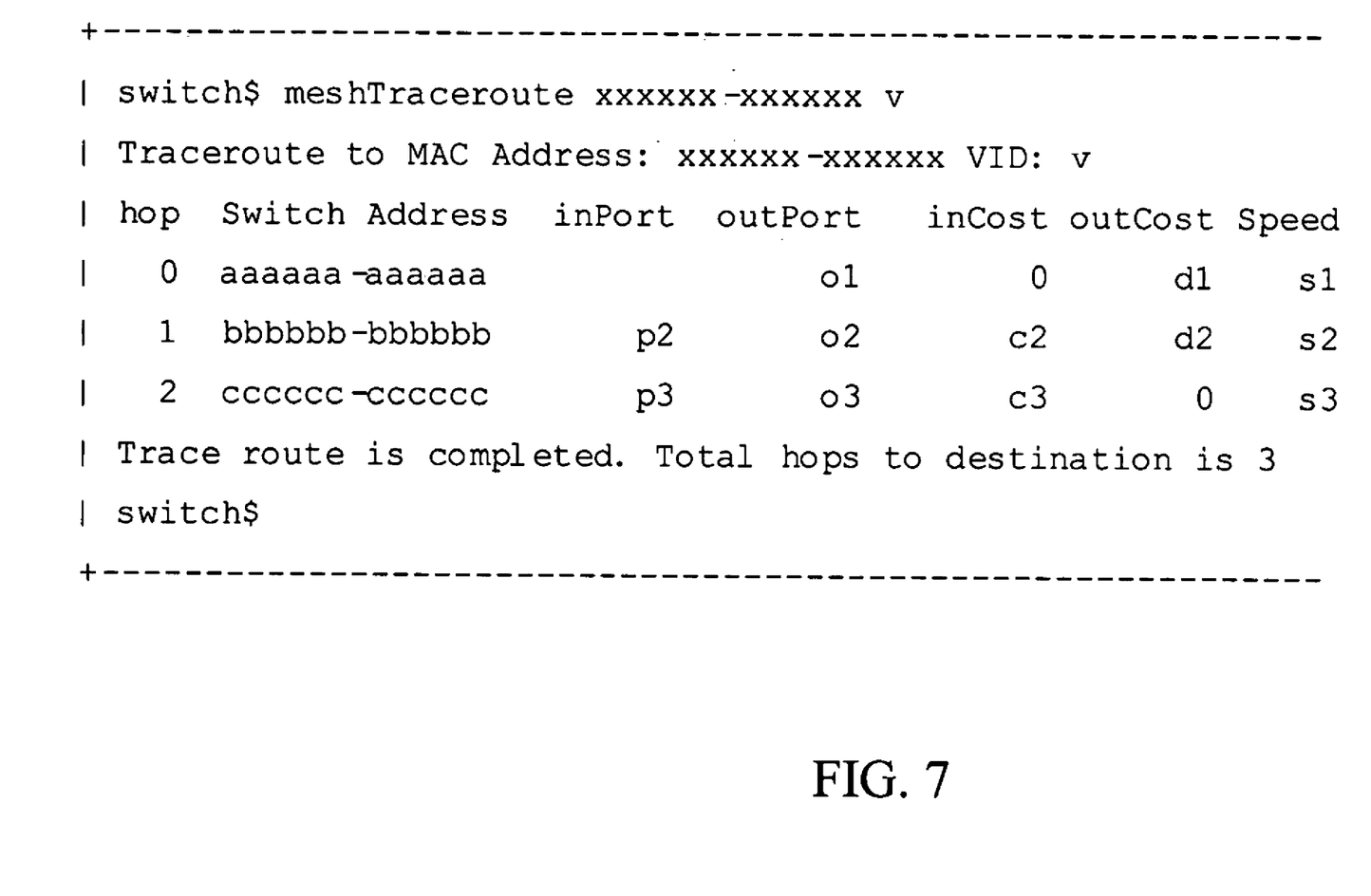
FIG. 7 is a diagram depicting an example output of a completed mesh traceroute command in accordance with an embodiment of the invention.

In one implementation, the user may type in the following command to perform a mesh traceroute:

meshTraceroute <mac_addr> <vid> where <mac_addr> is the search MAC address, and <vid> is the search VID. The user may be given an output of the format shown in FIG. 7 upon successful completion of the mesh traceroute. Note that the in-port for the first switch (the original switch) is blank because there is no such in-port on the original mesh switch. Similarly, there is no inbound cost information for the original mesh switch, and there is no outbound cost information for the destination mesh switch.

In one embodiment, the user should be able to kill the CLI response with a <CTRL><C> if the user does not wish to continue the trace. If this is the case, the mesh traceroute protocol may continue as normal, except that the original mesh switch will not report a result back to the user.

In one embodiment, a timeout value may be sent in the case where a problem could have occurred within the protocol. Problems within the protocol should in theory not happen because the packets are generally acknowledged, but just in case a problem occurs, the mesh traceroute may be set to terminate after a period of time, for example, 20 seconds. This period of time may, of course, be changed to be appropriate to the particular switching mesh.

Figure 5:
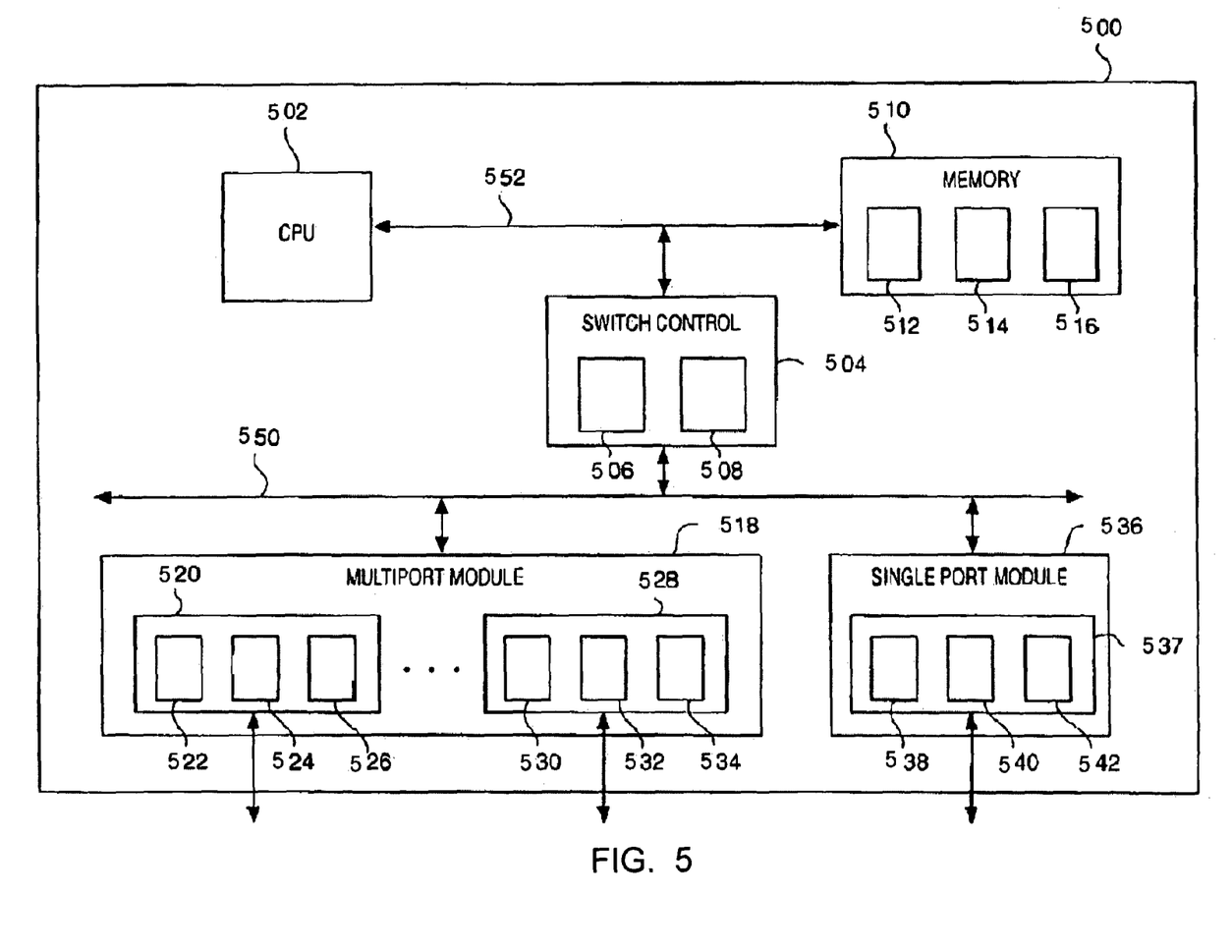
FIG. 5 is a schematic diagram of a packet switch operable in accordance with one embodiment of the invention.

FIG. 5 is a schematic diagram of packet switch 500 operable in accordance with one embodiment of the invention. The switch 500 may be configured to provide automated path tracing through a switching mesh as described above.

CPU 502 performs overall configuration and control of the switch 500 operation. CPU 502 operates in cooperation with switch control 504, an application specific integrated circuit (ASIC) designed to assist CPU 502 in performing packet switching at high speeds required by modern networks. Switch control 504 includes inbound and outbound high speed FIFOs (506 and 508, respectively) for exchanging data over switch bus 552 with port modules. Memory 510 includes a high and low priority inbound queue (512 and 514, respectively) and outbound queue 516. High priority inbound queue 512 is used to hold received switch control packets awaiting processing by CPU 502 while low priority inbound queue 514 holds other packets awaiting processing by CPU 502. Outbound queue 516 holds packets awaiting transmission to switch bus 550 via switch control 504 through its outbound FIFO 508. CPU 502, switch control 504 and memory 510 exchange information over processor bus 552 largely independent of activity on switch bus 550.

The ports of the switch may be embodied as plug-in modules that connect to switch bus 550. Each such module may be, for example, a multi-port module 518 having a plurality of ports in a single module or may be a single port module 536. A multi-port module provides an aggregate packet switch performance capable of handling a number of slower individual ports. For example, in the preferred embodiment, both the single port module 536 and the multi-port module 518 may be configured to provide, for example, approximately 1 Gbit per second packet switching performance. The single port module 536 therefore can process packet switching on a single port at speeds up to 1 Gbit per second. The multi-port module 518 provides similar aggregate performance but distributes the bandwidth over, preferably, eight ports each operating, for example, at speeds of up to 100 Mbit per second, or more.

Each port includes high speed FIFOs for exchanging data over its respective port. Specifically, each port, 520, 528, and 537, preferably includes an inbound FIFO 522, 530, and 538, respectively for receiving packets from the network medium connected to the port. Further, each port 520, 528, and 537, preferably includes a high priority outbound FIFO 524, 532, and 540, respectively, and a low priority outbound FIFO 526, 534, and 542, respectively. The low priority outbound FIFOs are used to queue data associated with transmission of normal packets while the high priority outbound FIFO is used to queue data associated with transmission of control packets. Each module (518 and 536) includes circuits (not specifically shown) to connect its port FIFOs to the switch bus 550.

As packets are received from a port, the packet data is applied to the switch bus 550 in such a manner as to permit monitoring of the packet data by switch control 504. In general, switch control 504 manages access to switch bus 550 by all port modules (i.e., 518 and 536). All port modules "listen" to packets as they are received and applied by a receiving port module to switch bus 550. If the packet is to be forwarded to another port, switch control 504 applies a trailer message to switch bus 550 following the end of the packet to identify which port should accept the received packet for forwarding to its associated network link.

Switch control 504 controls the "forwarding" of received packets to appropriate locations within the switch for further processing and/or for transmission out another switch port. In the preferred embodiment, switch control 504 performs at least the following operations:

a) maintains tables (under control of CPU 502) which direct packets for particular destination MAC addresses and VIDs to a selected port or ports; and b) performs procedures to implement the mesh traceroute technique as described above.

Those skilled in the art will recognize many other functions that may be performed in an ASIC assist device such as switch control 504. Similarly, those skilled in the art will recognize that the above and other functions may be performed by a suitable programmed general purpose processor having adequate performance or where the packet switching performance is a less critical factor.

Note that there may be certain specific cases that are not handled by the above-described mesh traceroute protocol. For example, one case involves multiple mesh links (i.e. trunked links) between two mesh switches. Accommodating this case may be accomplished by implementing additional bookkeeping (beyond that necessary for switching meshes without such multiple links between two mesh switches). Another case involves a temporary disconnection of a single link between two mesh switches. A way to accommodate this case may involve all switches receiving TRACE_COMPLETE or TRACE_HOP packets to check if the search MAC/VID is still associated with the port that the packet came in on.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of automated path tracing from an original mesh switch through a switching mesh to a specified destination, the method comprising:

building a mesh traceroute packet to the specified destination;

transmitting the mesh traceroute packet via an exit port associated with the specified destination; and receiving the mesh traceroute packet as returned, wherein the mesh traceroute packet as returned includes a plurality of hop entries providing a path trace from the original mesh switch through the switching mesh to the specified destination, each hop entry including a hop media access (MAC) address, a hop in-port, and a hop out-port.

2. The method of claim 1, wherein the specified destination comprises a search MAC address and VLAN identifier.

3. The method of claim 1, further comprising:

determining whether a trace complete flag in the returned packet is set; and outputting results from a completed mesh traceroute if the trace complete flag is set and if a trace found flag is set.

4. The method of claim 3, further comprising:

generating an error message if the trace complete flag is clear or if failure is indicated by another flag.

5. The method of claim 1, further comprising:

receiving the mesh traceroute packet at a hop mesh switch;

appending a hop entry to the mesh traceroute packet; and forwarding the packet via a hop out-port to a next mesh switch.

6. The method of claim 5, further comprising:

receiving the mesh traceroute packet at a destination mesh switch;

appending a final hop entry to the mesh traceroute packet;

marking a trace complete flag; and sending the packet back towards the original mesh switch.

7. The method of claim 6, wherein the packet is sent back towards the original mesh switch by way of a reverse trace path.

8. A switching device configured to be a member of a switching mesh, the switching device comprising:

a plurality of ports; and a switch control device coupled to the plurality of ports, wherein the switch control device is configured to perform an automated method of tracing a path through the switching mesh to a specified destination, wherein the automated method is accomplished by building a mesh traceroute packet to the specified destination, transmitting the mesh traceroute packet from an exit port associated with the specified destination, and receiving the mesh traceroute packet as returned via the same port, wherein the mesh traceroute packet as returned includes a plurality of hop entries providing a path trace from the original mesh switch through the switching mesh to the specified destination, each hop entry including a hop media access (MAC) address, a hop in-port, and a hop out-port.

9. The switching device of claim 8, wherein the specified destination comprises a search MAC address and VLAN identifier.

10. A method of responding to receipt of a mesh traceroute packet during an automated path tracing, the method comprising:

receiving the mesh traceroute packet at a mesh switch; and if the mesh switch is determined to comprise a hop mesh switch, then appending a hop entry to the mesh traceroute packet, wherein the hop entry includes a hop media access (MAC) address, a hop in-port, and a hop out-port, and forwarding the packet via the hop out-port to a next mesh; and if the mesh switch comprises is determined to comprise a destination mesh switch, then filling in at least a hop in-port in the hop entry, marking a trace complete flag, and returning the packet towards the original mesh switch via the hop in-port.

* * * * *

UNITED STATES PATENT AND TRADEMARK OFFICE
CERTIFICATE OF CORRECTION

PATENT NO.       : 7,447,222 B2                           Page 1 of 1
APPLICATION NO.  : 10/706653
DATED            : November 4, 2008
INVENTOR(S)      : Shaun Kazuo Wakumoto et al.

It is certified that error appears in the above-identified patent and that said Letters Patent is hereby corrected as shown below:

In column 13, line 7, in Claim 10, delete "mesh" and insert -- mesh switch --, therefor.

Signed and Sealed this

Twenty-third Day of February, 2010

David J. Kappos
*Director of the United States Patent and Trademark Office*